US009513837B2

(12) United States Patent
Jenkins et al.

(10) Patent No.: US 9,513,837 B2
(45) Date of Patent: Dec. 6, 2016

(54) PERFORMANCE ASSIST STORAGE VOLUMES

(75) Inventors: Aaron L Jenkins, Tomball, TX (US); Paul Miller, Houston, TX (US); Chiung-Sheng Wu, The Woodlands, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1059 days.

(21) Appl. No.: 13/271,563

(22) Filed: Oct. 12, 2011

(65) Prior Publication Data

US 2013/0097118 A1    Apr. 18, 2013

(51) Int. Cl.
 *G06F 3/06* (2006.01)
(52) U.S. Cl.
 CPC .............. *G06F 3/065* (2013.01); *G06F 3/067* (2013.01); *G06F 3/0611* (2013.01); *G06F 3/0635* (2013.01)
(58) Field of Classification Search
 CPC ....................................................... G06F 3/065
 USPC .................. 707/E17.01, E17.005, E17.014, 707/E17.032, E17.033, E17.12, 705, 769, 707/816, 999.01, 999.101, 999.102, 707/999.202, 999.204, 999.205, 999.206, 707/634; 709/213, 224, 212, 219, 220, 226, 709/240, 242; 710/44, 240; 711/118, 122, 711/133, E12.001, E12.024, 137, E12.017, 711/E12.057, 136, E12.018, 104, 125, 129, 711/154, E12.008, E12.02, E12.072, 144, 711/E12.019, E12.038, E12.043, E12.045, 711/113, 119, 138, E12.002, E12.021, 711/E12.022, E12.023, E12.054, E12.071, 711/103, 105, 112, 114, 130, 165, 167, 170, 711/216, 3, E12.026, E12.037, E12.041, 711/E12.061, E12.075, E12.076, 102, 106, 711/111, 124, 126, 147, 156, 161, 162, 173, 711/204, 205, 206, 207, 213, 214, 6; 712/227, 229, E9.016, E9.045, 209, 712/225, 226, 233, 32, E9.021, E9.042, 712/E9.046, E9.047, E9.049, 10, 202, 203, 712/206, 207, 216, 217, 219, 220, 228, 237, 712/244, 34, 43; 717/138, 127, 136, 139, 717/149, 151
See application file for complete search history.

(56) References Cited

U.S. PATENT DOCUMENTS 6,560,679 B2 *  5/2003  Choi et al. ................... 711/138
7,584,319 B1    9/2009  Liao et al.
(Continued)

FOREIGN PATENT DOCUMENTS

CN    101819508    9/2010

*Primary Examiner* — Boris Gorney
*Assistant Examiner* — Amanda Willis
(74) *Attorney, Agent, or Firm* — Hewlett Packard Enterprise Development LP

(57) ABSTRACT

Techniques for allocation of storage volumes are described. Response times of a primary storage may be monitored to determine if the primary storage is input/output limited. A performance assist storage volume may be allocated and data replicated between the primary storage and the performance assist storage volume. Input/output requests may be distributed between the primary storage and the performance assist storage volume.

13 Claims, 3 Drawing Sheets

(56) References Cited

U.S. PATENT DOCUMENTS

| | | |
|---|---|---|
| 7,644,304 B2 | 1/2010 | Kotzur et al. |
| 7,769,831 B2 | 8/2010 | Johnson |
| 2003/0079018 A1* | 4/2003 | Lolayekar et al. ............ 709/226 |
| 2004/0172494 A1* | 9/2004 | Pettey et al. .................. 710/305 |
| 2007/0083727 A1* | 4/2007 | Johnston ............... G06F 3/0613 |
| | | 711/170 |
| 2008/0147920 A1* | 6/2008 | Mohan et al. ................... 710/58 |
| 2008/0244620 A1 | 10/2008 | Cagno et al. |
| 2009/0249018 A1* | 10/2009 | Nojima et al. ................ 711/170 |
| 2011/0022736 A1 | 1/2011 | Uddenberg et al. |
| 2011/0107129 A1 | 5/2011 | Sinykin et al. |

* cited by examiner

PERFORMANCE ASSIST STORAGE VOLUMES

BACKGROUND

A common server pattern in datacenters is the use of large numbers of identically configured servers. The servers, also referred to as nodes, within the datacenter may each be associated with storage devices, such as disk volumes. Because the nodes are identically configured, the data contained on the storage devices associated with each node is also identical. When a request for data access is received at the datacenter, the request may be sent to any server, because they are all identical. The processing load can be distributed throughout all of the servers in the datacenter by distributing requests evenly amongst all of the servers within the datacenter.

DETAILED DESCRIPTION

Figure 1:
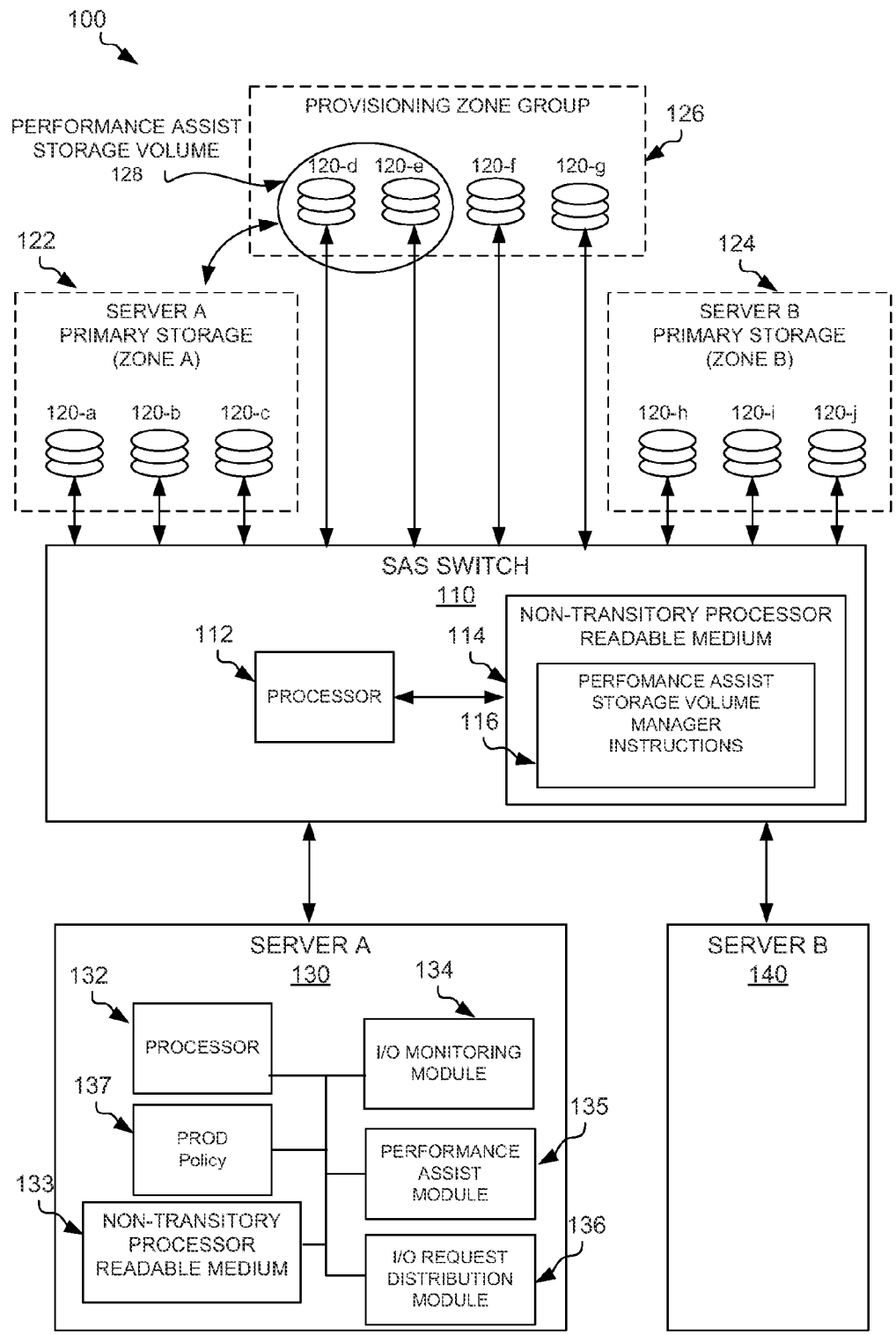
FIG. 1 is an example of a system that may implement techniques described herein.

Although the use of identically configured servers in a datacenter may simplify the task of distribution of processing load, such solutions may be economically infeasible. Large amounts of data may be stored in a datacenter. The cost of providing storage sufficient to store all of the data multiplied by the total number of servers in the datacenter may greatly outweigh the cost savings achieved through the simplified process of load distribution.

For example, a movie on demand system may provide access to hundreds or thousands of different movies. A user, through his computer or set top device, may access the movie on demand system datacenter to request a movie. The user's request may be assigned to any server within the datacenter in accordance with the processing load distribution mechanism described above. However, in order for the processing load distribution mechanism to work, the data that makes up every available movie must be available on every server, because it is not known in advance to which server the user's request will be assigned.

In order to overcome the need to duplicate all available data to all servers within a datacenter, some datacenters may distribute the data amongst the servers, such that each server may contain a subset of the complete set of data. When a user requests data, the request is routed to one of the servers whose subset of data includes the requested data. Continuing with the movie on demand system example, the complete set of movies may be divided by the total number of servers within the datacenter. The data for each movie in each subset of movies may then be stored on one of the servers. When a user request for a particular movie is received, that request may be routed to the server whose subset of data includes the requested movie. Thus, the movie need not be available on every server within the datacenter, reducing the overall amount of storage required for each server which in turn reduces the cost associated with each server.

Although distributing the data amongst the servers alleviates the need to store all data on every server, such a scheme introduces a new problem. When a request for a particular portion of data, such as a movie, is received, that request has to be routed to a server that contains the requested portion of data and can no longer be routed to any server within the datacenter. As a result, servers which contain data that is in great demand may become overloaded with users' requests. Again, using the movie on demand system example, a new release movie may be in great demand for a period of time. The servers which contain the new release movie may become overloaded for a period of time. However, the high level of demand may subside once the movie has been viewed by more and more users, as the number of users who have yet to see the movie declines.

One example manifestation of an overloaded server may be in the input/output (I/O) load. When a server wishes to access data contained in storage, an I/O request may be sent to a storage controller. The storage controller may then retrieve the data from a storage device. Once the data has been retrieved, the storage controller may inform the server that the data is available for use and any additional processing, such as sending the data to a user, may be completed. When many users are requesting data from the server, the server may send many I/O requests to the storage controller. The storage controller may be connected to multiple storage devices, and I/O requests directed to different storage devices may be processed by the storage controller in parallel. However, requests that are directed to the same storage device will typically be placed into a queue because a storage device may only be able to handle one I/O request at a time (e.g. a hard disk drive cannot read data from two different locations on the disk at the same time).

Although algorithms may exist to reorder the I/O requests such that the storage device may more efficiently read data from the storage device, such mechanisms do not overcome the issue that the storage device may only read from one position of the storage medium at a time. If data is being read from one portion of a storage device, additional I/O requests may wait in queue until the read operation is complete. As the number of I/O requests increases, each request may spend longer and longer periods of time in queue waiting to be acted upon. As such, the storage device may become I/O limited, because the ability of the server to process requests is limited by the amount of time consumed by I/O operations. The problems described above also occur when data is being written to storage devices.

Techniques described herein overcome the problem of an I/O limited primary storage through the use of a performance assist storage volume. A server may monitor I/O response times to determine if a primary storage has become I/O limited. The determination may be based on a performance re-allocation on demand (PROD) policy that is specified by a system administrator. Once the response times have exceeded a threshold set in the PROD policy, the system may automatically request allocation of a performance assist storage volume from a pool of available storage devices. If there are available storage devices in the pool, a performance assist storage volume may be allocated to the server.

Portions of data may then be replicated between the primary storage and the performance assist storage volume. When an I/O request is received, it may be determined if the requested data resides on the performance assist storage volume. If so, the I/O request may be assigned to the I/O request queue for either the primary or the performance assist storage volume. The assignment may be based on factors such as the response time for each queue or the length of each queue. As such, the server is able to add additional I/O capacity through the use of the performance assist storage volume.

Furthermore, the process may reiterate. I/O response times for the primary storage and performance assist storage volume may be monitored. If the response times exceed a threshold specified in the PROD policy, an additional performance assist storage volume may be allocated and data replicated to it. As such, the I/O capacity of the server may be further increased. Conversely, the number of I/O requests for a server may decrease if the data stored on that server is no longer in high demand. By monitoring the response times of the primary storage and performance assist storage volume, it may be determined that the performance assist storage volume is no longer needed. For example, once the response times for the volumes have fallen below a threshold specified by the PROD policy, the performance assist storage volume may be de-allocated. The storage devices used to create the performance assist storage volume may be returned to the pool of available storage devices. These storage devices may then be available to be re-allocated as a performance assist storage volume for another server that has become I/O limited.

Aside from system administrator specification of the PROD policy, the techniques described herein do not require any additional user or administrator action. Performance assist storage volumes may be allocated and de-allocated based on measured response times and the availability of storage devices in the pool of storage devices. I/O requests may be directed to primary or performance assist storage volumes by the server, without external input. Thus, neither the user nor the system administrator need be aware of whether an I/O request is handled by primary storage or a performance assist storage volume.

FIG. 1 is an example of a system that may implement techniques described herein. System 100 is an example of a system that utilizes a Serial Attached Small Computer Systems Interface (SAS) architecture. Although system 100 is presented in terms of an example system using an SAS architecture, this is for description purposes only. Other system architectures, such as Storage Area Networks (SAN) or Direct Attached Networks (DAN), may also benefit from the techniques described herein.

System 100 may include an SAS switch 110, storage devices 120(a-j), and servers 130, 140. Although only a limited number of elements are shown in FIG. 1, this is for purposes of ease of description. System 100 may include any number of the previously identified elements. SAS switch 110 may provide a fabric that allows servers 130, 140 to communicate with storage devices 120(a-j). For example, the SAS switch may include a number of ports, and these ports may be connected to servers and storage devices. Commands, such as I/O commands, that are directed to a storage device may be received by the SAS switch from a server. The SAS switch may then route the command to a port that is connected to the storage device that the command is directed toward.

In an example implementation, SAS switch 110 may include a processor 112 that is able to read and execute instructions to provide the functionality described herein. Coupled to the processor may be a non-transitory processor readable medium 114 containing thereon a set of instructions that are executable by the processor. For example, the medium 114 may contain a set of instructions that provides the functionality of a performance assist storage volume manager 116. An example of the functionality provided by the performance assist storage volume manager instructions is described with respect to FIG. 3. One example of the functionality provided is to receive requests for allocation of a performance assist storage volume and to allocate such a volume if sufficient storage resources are available. Another example of functionality provided is to receive a request for de-allocation of a performance assist storage volume and to return the storage devices to a pool of available storage devices. Operation of the performance assist storage volume manager will be described in further detail below.

System 100 may also include a number of storage devices 120(a-j). Storage devices 120 may include any number of different types of devices. For example, storage devices may include hard disk drives, solid state drives, optical drives, tape drives, or any other type of storage that is able to store data. The storage devices 120 may be coupled to the SAS switch 110. In an example embodiment, the storage devices 120(a-j) may be segregated into groups. For example, in an SAS architecture, the storage devices may be segregated into zones. A characteristic of a zone may be that servers that are assigned to a given zone are able to access the storage devices within that zone.

As shown in FIG. 1, storage devices 120(a,b,c) may be assigned to a first zone that is referred to in the figure as Server A primary storage 122, which for purposes of description will be referred to as ZONE A. The storage devices that are included in ZONE A may be configured in any number of ways. Each device may be configured as a separate volume, or all of the devices may be aggregated into a single volume. In addition, the volumes may be configured to provide data redundancy, such as in any number of Redundant Array of Independent Disks (RAID) configurations. For example, in a RAID-1 configuration, copies of the data may be maintained on multiple storage devices within ZONE A. What should be understood is that regardless of the configuration of the individual storage devices within the Server A primary storage zone, these storage devices are designated as belonging to ZONE A. As such, servers that are also designated as belonging to ZONE A may access data stored on the storage devices within ZONE A.

Likewise, there may be a second zone that is referred to in the figure as Server B primary storage 124, which for purposes of description will be referred to as ZONE B. Just as above, the storage devices 120(h,i,j) be configured in any number of different configurations. Again, servers designated as belonging to ZONE B may access data stored on the storage devices within ZONE B.

The storage devices assigned to zones A and B may typically remain assigned to a zone, and thus to a server within their respective zones, on a relatively static basis. In other words, primary storage indicates the storage devices that remain assigned to a server, unless manually reconfigured. For purposes of this description, the storage devices that are designated as belonging to a server zone may not be dynamically added and removed from the zone, such that the storage devices maintain a relatively permanent association with a server within the zone.

System 100 may also include storage devices 120(d,e,f,g) which are assigned to a provisioning zone group 126. A provisioning zone group may form a pool of storage resources that are available for temporary allocation to other zones. Once the need for the storage resources is no longer present, the storage devices may be de-allocated from the zone, and returned to the provisioning zone group, thus returning the storage devices to the pool for future allocation. For example, if server A becomes I/O limited, a performance assist volume made up of storage devices in the provisioning zone group 126 may be allocated. Once the server is no longer I/O limited, the storage devices may be returned to the provisioning zone group. Allocation and de-allocation of a performance assist storage volume will be described in further detail below.

System 100 includes servers, as mentioned above. As shown, system 100 may include server A 130 and server B 140. Any number of additional servers may also be included. For ease of description, only server A 130 is described in detail, however it should be understood that all servers within system 100 may provide substantially the same capabilities. Server A 130 may include a processor 132 to execute instructions to implement the techniques described herein. Coupled to the processor may be a non-transitory processor readable medium 133 which contains thereon a set of instructions, which if executed by the processor cause the server to provide the functionalities described herein. For example, the medium 133 may provide instructions for implementing an I/O monitoring module 134, a performance assist module 135, a I/O request distribution module 136, and storage for a PROD policy 137. Each of these elements are described in further detail below. Although the various modules may be implemented as instructions executed by a processor, in other example implementations, the modules may be implemented in hardware. For example, the functionality described herein may be implemented as an application specific integrated circuit (ASIC). In yet other example implementations, the modules may be implemented as a combination of processor executable instructions and logic contained in hardware. In one example implementation, the modules mentioned above may be included on a storage controller within a server.

I/O monitoring module 134 may monitor the I/O functions of the server 130. For example, as I/O requests are generated by the server, the requests may be placed in a queue (not shown). I/O monitoring module 134 may measure and record the length of the queue at any given point in time. The I/O monitoring module may also monitor other types of data, such as response times for I/O requests. The I/O monitoring module may also monitor the data that is being accessed in various I/O requests. The I/O monitoring module may monitor these characteristics and other of I/O requests over a period of time. Based on the monitoring, the data may be used to compare the actual I/O request characteristics with the PROD policy 137, which is described below.

A system administrator may establish parameters for when a server may be determined to be I/O limited, and may specify those parameters in a Performance Re-allocation on Demand (PROD) policy. For example, a system administrator may decide that if a certain number of I/O requests have a response time above an administrator specified threshold within an administrator specified period of time, the server will be considered I/O limited. Likewise, the system administrator may specify in the PROD policy when a server will no longer be considered I/O limited. For example, when no response times for any I/O request exceed an administrator specified threshold for an administrator specified period of time, the server may be considered as no longer being I/O limited.

In other words, the I/O monitoring module 134 may be responsible for measuring the actual performance characteristics of I/O requests, while the PROD policy 137 is specified by a system administrator to establish when a server is/is not I/O limited based on the performance characteristics. A performance assist module 135 may compare the actual I/O request performance with the specified PROD policies. When a server is indicated as I/O limited based on the PROD policy, the performance assist module may request allocation of a performance assist storage volume. Once the server is no longer I/O limited, as determined by the I/O monitoring module in conjunction with the PROD policy, the performance assist storage module may request de-allocation of the performance assist storage volume.

In addition to requesting allocation/de-allocation of a performance assist storage volume, performance assist storage module 135 may also replicate data from primary storage to the performance assist storage volume. As mentioned above, I/O monitoring module 134 may monitor the data that is being accessed in I/O requests. When a performance assist storage volume is allocated, the performance assist module may replicate data, such as the most frequently accessed data, from the primary storage to the performance assist storage volume. I/O request distribution module 136 may receive I/O requests from the server. If a performance assist storage volume has been allocated, I/O request distribution module 136 may receive I/O requests, and determine if the requested data resides on both the primary storage and the performance assist storage volume.

If the data is available from both sources, the I/O request distribution module 136 may assign requests to the queues (not shown) for either the primary or performance assist storage based on any number of factors. For example, in a simple example implementation, the requests may be assigned to whichever queue is shortest. In other examples, the request may be assigned based on the queue that has the fastest response time. Regardless of the particular distribution criteria, the I/O request distribution module 136 may distribute I/O requests to the storage devices that are able to fulfill those requests.

In an example of operation, a server, such as server A 130 may generate I/O requests. The requests may be for reading or writing data to server A primary storage 120. For purposes of ease of description, only read operations are described, however it should be understood that the techniques described herein are equally applicable to write operations. I/O monitoring module 134 may monitor response times for the I/O requests. The performance assist module 135 may compare the measured response times with threshold values specified by a system administrator in a PROD policy 137. For example, the PROD policy may specify that if the count of the number of I/O requests with a response time greater than a specified time exceeds a threshold, the server is to be considered I/O limited.

The performance assist module 135 may send a request to the SAS switch 110 for allocation of a performance assist storage volume. For example, the request may be received by the processor 112 which executed the instructions contained in the performance assist storage volume manager 116. The performance assist storage volume manager may then determine if storage resources 120 are available within the provisioning zone group 126. If so, the performance assist storage volume manager may allocate a performance assist storage volume for use by server A. In some implementations, the request for a performance assist storage volume may include a requested size of a storage volume. If there are insufficient storage resources for allocation of a performance assist volume of the requested size, a smaller volume may be allocated. However, if no storage resources are available, the request may be denied, and the server may remain I/O limited.

If at least some storage resources are available, the performance assist storage volume manager may cause the storage devices that will be allocated for use as a performance assist storage volume to be rezoned into the zone of the requesting server. As shown in FIG. 1, storage devices 120(d,e) may have been available in the pool of available storage resources. Those devices may be allocated as a performance assist storage volume 128. Although the term performance assist storage volume has been used, this is for purposes of explanation, and not limitation. The individual storage devices may be allocated as individual volumes, may be aggregated into a single volume, or may themselves be configured in a redundant configuration, such as a RAID array.

Once the performance assist storage volume 128 has been allocated, the performance assist storage module may replicate data from the primary storage to the performance assist storage volume. In a simple case, where the size of a performance assist storage volume is the same or greater than the primary storage, all of the data on the primary storage volume may be replicated. In other cases, the performance assist module may determine which data on the primary volume is most frequently accessed, based on the monitoring performed by the I/O monitoring module. In such cases, the most frequently accessed data may be replicated between the primary storage and the performance assist storage volume.

The I/O request distribution module may distribute I/O requests between the primary storage and the performance assist storage volume. For example, if a portion of data that is needed by an I/O request is present on both the primary storage and the performance assist storage volume, the request may be distributed based on any number of factors. In a simple example implementation, the requests may be distributed in a round robin fashion. In more complex example implementations, the requests may be distributed based on the lengths or response times of the queues associated with the primary or performance assist storage. What should be understood is that the allocation of a performance assist storage volume may reduce the impact of a server being I/O limited by increasing the I/O capacity available to the server. Prior to the allocation of a performance assist storage volume, all data was accessed on the primary storage. Once a performance assist storage volume has been allocated, both the primary and performance assist storage can respond to I/O requests.

At some point, the performance assist storage module 135 in conjunction with the I/O monitoring module 134 may determine that the server is no longer limited. For example, if response times for I/O requests for the server drop below a threshold specified in the PROD policy 137, the server may no longer be I/O limited. The performance assist module may then send a request to the performance assist storage volume manager that indicates that the performance assist storage volume is no longer needed. The performance assist storage volume manager may then de-allocate the performance assist storage volume 128. The storage devices 120(d,e) that made up the performance assist storage volume may then be returned to the pool of available storage resources. For example, the storage devices 120(d,e) may be returned to the provisioning zone group 126. The storage devices 120(d,e) may then be made available for allocation to a server that has become I/O limited.

It should be understood that performance assist storage volumes are temporarily allocated to a server that has become I/O limited. Once the server is no longer I/O limited, the storage resources again become available for use with other servers. As such, additional I/O capacity does not need to be permanently added to a server, but rather can be allocated as needed. Furthermore, although the above description has been in terms of an architecture utilizing a SAS fabric, the techniques described herein are not limited to such architectures. For example, the techniques described herein may be utilized in any architecture that allows for a pool of storage devices to be allocated and de-allocated to/from a server.

Figure 2:
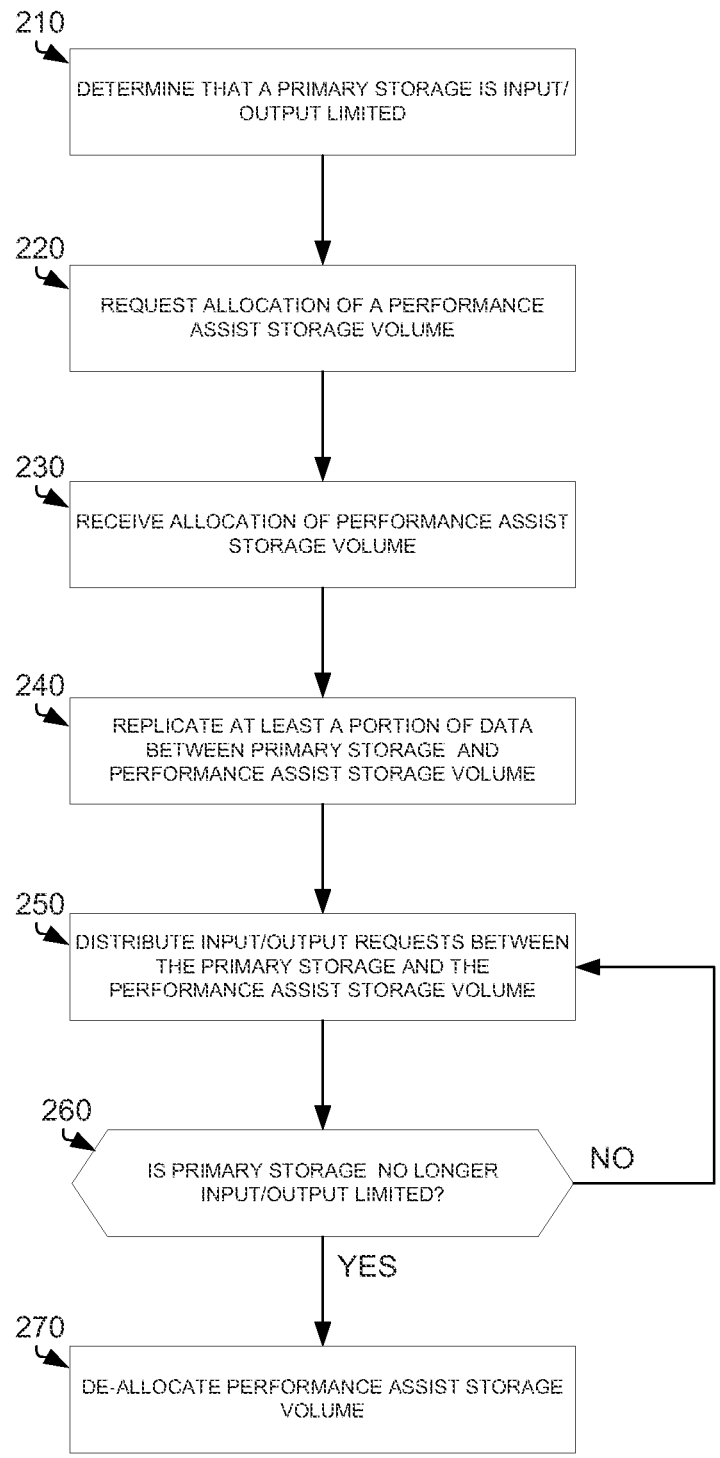
FIG. 2 is an example of a high level flow diagram for accessing storage volumes.

FIG. 2 is an example of a high level flow diagram for accessing storage volumes. The process depicted in FIG. 2 may be included as instructions in the non-transitory processor readable medium shown in server 120. In block 210 it may be determined that a primary storage volume is I/O limited. As described above, this determination may be made based on a PROD policy. If thresholds defined within the PROD policy have been exceeded, a server may determine that the primary storage volume is I/O limited. In block 220, a request for allocation of a performance assist storage volume may be made. In an SAS architecture, the request may be sent to a process running on an SAS switch. In other architectures, the request may be sent to another element that is responsible for allocation/de-allocation of storage volumes to a server. For example, there may be a centralized or distributed arbiter of dynamic allocation of storage resources. Regardless of the specific element that controls allocation of storage volumes, a request for allocation of a performance assist storage volume may be made by a server. The request for a performance assist storage volume may include a request for a storage volume of a certain size.

In block 230, an allocation of a performance assist storage volume may be received. The performance assist storage volume may be of a certain size. That size may be less than the size that was requested, if a size was included in the request. In block 240, at least a portion of the data that is stored on the primary storage volume may be replicated to the performance assist storage volume. In some implementations, the data that is most frequently requested from the primary storage volume may be replicated to the performance assist storage volume. In one implementation, if the size of the allocated performance assist storage volume is at least as large as the size of the primary storage volume, the entire contents of the primary storage volume may be replicated.

In block 250, I/O requests may be distributed between the primary storage volume and the performance assist storage volume. For example, if an I/O request for a piece of data is received by a server, it may be determined if the data resides on the performance assist storage volume. If so, the server may place the I/O request in a queue for either the primary or performance assist storage volume. The determination of which queue in which to place the request may be made based on any number of factors. Some exemplary factors may include the response times for each of the queues, the length of each of the queues, or a simple round robin distribution scheme. The particular distribution scheme is relatively unimportant, however what should be understood is that the addition of the performance assist storage volume allows for an increase in the I/O capacity of the server because I/O requests may now be serviced by either the primary or performance assist storage volume.

In block 260 it may be determined that the primary storage volume is no longer I/O limited. Just as in block 210, the PROD policy may be used to determine when a primary storage volume is no longer I/O limited. For example, once response times for the primary storage volume have dropped below a threshold specified in the PROD policy, it may be determined that the primary storage volume is no longer I/O limited. If the primary storage volume is still I/O limited, the process may return to block 250.

If the primary storage volume is no longer I/O limited, the process moves to block 270. In block 270 the performance assist storage volume may be de-allocated. The storage devices used to create the performance assist storage volume may be returned to the pool of available storage devices. The storage devices may then be made available to provide a performance assist storage volume as needed for other servers.

Figure 3:
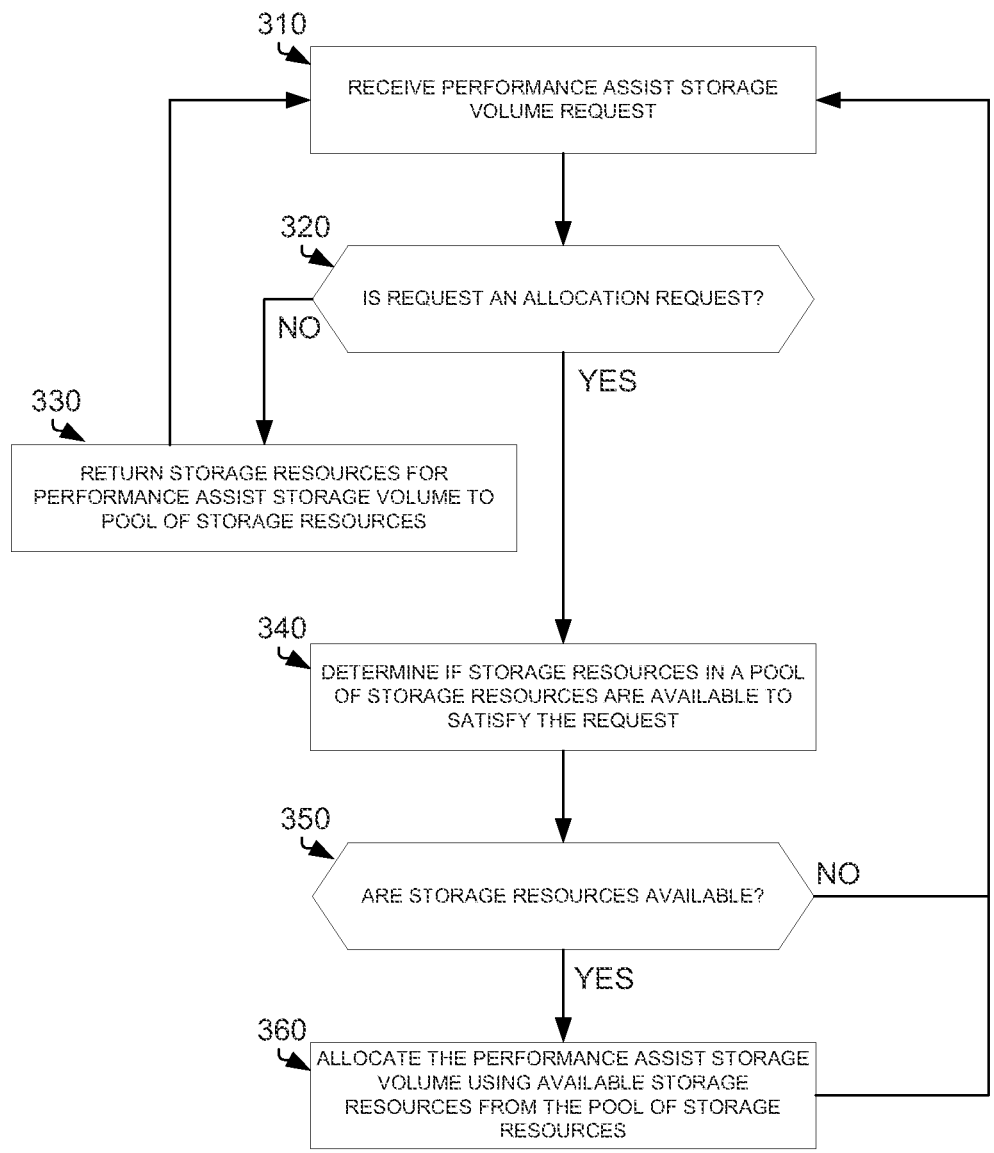
FIG. 3 is an example of a high level flow diagram for allocating storage resources.

FIG. 3 is an example of a high level flow diagram for allocating storage resources. The process shown in FIG. 3 may be included as instructions in the non-transitory processor readable medium of the SAS switch 110. In block 310 a request may be received for a performance assist storage volume. For example, the request may be sent from a server, such as server 130. In block 320 it may be determined if the request is for an allocation of a performance assist storage volume. If the request is not an allocation request, then it is a de-allocation request and the process moves to block 330. In block 330, the storage resources that make up the performance assist storage volume may be returned to the pool of storage resources. The storage resources may then be made available for use in creating new performance assist storage volumes as needed.

If it is determined in block 320 that the request is an allocation request, the process moves to block 340. In block 340 it may be determined if storage resources in a pool of storage resources are available to satisfy the request for allocation of a performance assist storage volume. In block 350, the results of the determination may be evaluated. If storage resources are not available, the process moves to step 310, and may repeat until storage resources are available to be allocated as a performance assist storage volume.

If storage resources are determined to be available in block 350, the process moves to block 360. In block 360 a performance assist storage volume may be allocated to the requestor using available resources from the pool of storage resources. The performance assist storage volume may remain allocated to the requestor until such time as the requestor determines that it is no longer needed. At that time, the requestor may send a request to de-allocate the performance assist storage volume which may be processed as was described above.

We claim:

1. A method comprising:
   determining that a primary storage associated with a computer is input/output limited, the primary storage storing primary data;
   in response to the determining, requesting and receiving an allocation of a performance assist storage volume;
   identifying the most frequent accessed of the primary data;
   replicating at least a portion but not all of the primary data to the performance assist storage volume, the portion including thee most-frequently accessed data; and
   distributing input/output requests between the primary storage and the performance assist storage volume.

2. The method of claim 1 further comprising:
   de-allocating the performance assist storage volume once the primary storage is no longer input/output limited.

3. The method of claim 1 wherein determining that the primary storage is input/output limited further comprises:
   counting a number of input/output requests to the primary storage whose response times exceed a threshold value, over a defined period of time; and
   determining that the primary storage is input/output limited when the count exceeds a value specified in a performance re-allocation on demand policy.

4. The method of claim 1 wherein distributing the input/output requests further comprises:
   receiving an input/output request specifying a portion of data;
   in response to the input/output request, determining if the specified portion of data is available on both the primary storage and the performance assist storage volume; and
   adding the input/output request to a queue associated with either the primary storage or the performance assist storage volume based on the length of the queues associated with the primary storage and the performance assist storage volume.

5. The method of claim 1 wherein distributing the input/output requests further comprises:
   receiving an input/output request specifying a portion of data;
   determining if the specified portion of data is available on both the primary storage and the performance assist storage volume; and
   adding the input/output request to a queue associated with either the primary storage or the performance assist storage volume based on response times of the queues associated with the primary storage and the performance assist storage volume.

6. The method of claim 1 wherein the performance assist storage volume comprises more than one storage device.

7. A device comprising:
   a processor; and
   non-transitory media encoded with code that, when executed, causes the processor to define:
      an input/output monitoring module that measures response times for input/output requests to a primary storage and that identifies the most-frequently accessed data of the primary data stored on the primary storage;
      a performance assist module that allocates a performance assist storage volume based on the response times and replicates a portion but not all of the primary data to the performance assist storage volume, the portion including the most-frequently accessed data; and
      an input/output request distribution module that distributes input/output requests between the primary storage and the performance assist storage volume.

8. The device of claim 7 wherein the performance assist module further:
   receives an allocation response indicating a size of the performance assist storage volume that is allocated.

9. The device of claim 7 wherein the input/output monitoring module further measures response times of input/output requests on the performance assist storage volume and the performance assist module further de-allocates the performance assist storage volume based on the response times of the primary storage and the performance assist storage volumes.

10. The device of claim 7 wherein the performance assist module allocates a performance assist storage volume based on the response times and a predetermined performance allocation on demand policy.

11. Non-transitory media encoded with a set of processor readable instructions which, if executed by hardware including a processor, causes the hardware to implement a method including:
    determining that a primary storage associated with a computer is input/output limited, the primary storage primary data;

in response to the determining, requesting and receiving an allocation of a performance assist storage volume;

identifying the most frequently accessed of the primary data;

replicating at least a portion but not all of the primary data to the performance assist storage volume, the portion including the most-frequently accessed data; and distributing input/output requests for the portion between the primary storage and the performance assist storage volume.

12. The media of claim 11 wherein the instructions further cause the processor to:

receive a request for de-allocation of a performance assist storage volume; and return the storage resources to the pool of storage resources.

13. The media of claim 11 wherein the pool of storage resources is a plurality of storage drives in a Serial attached SCSI provisioning zone group.

* * * * *